(12) United States Patent
Vitaladevuni et al.

(10) Patent No.: US 9,940,949 B1
(45) Date of Patent: Apr. 10, 2018

(54) DYNAMIC ADJUSTMENT OF EXPRESSION DETECTION CRITERIA

(71) Applicant: Amazon Technologies, Inc., Seattle, WA (US)

(72) Inventors: Shiv Naga Prasad Vitaladevuni, Cambridge, MA (US); Philip Ryan Hilmes, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 182 days.

(21) Appl. No.: 14/578,097

(22) Filed: Dec. 19, 2014

(51) Int. Cl.
    *G10L 25/78* (2013.01)
    *H04R 3/00* (2006.01)
(52) U.S. Cl.
    CPC .............. *G10L 25/78* (2013.01); *H04R 3/005* (2013.01)
(58) Field of Classification Search
    CPC .................................................... H04R 3/005
    See application file for complete search history.

(56) References Cited

U.S. PATENT DOCUMENTS

| | | | | |
|---|---|---|---|---|
| 2006/0074651 A1* | 4/2006 | Arun | ...................... | G10L 15/22 704/233 |
| 2010/0292991 A1* | 11/2010 | Lv | ........................... | A63F 13/10 704/275 |
| 2014/0350926 A1* | 11/2014 | Schuster | ................ | G10L 15/00 704/233 |
| 2015/0112671 A1* | 4/2015 | Johnston | ................ | H04R 3/005 704/233 |

\* cited by examiner

*Primary Examiner* — Qian Yang
(74) *Attorney, Agent, or Firm* — Lee & Hayes, PLLC (57) ABSTRACT

In a speech-based system, a wake word or other trigger expression is used to preface user speech that is intended as a command. The system receives multiple directional audio signals, each of which emphasizes sound from a different direction. The trigger expression is detected in an individual directional audio signal by comparing a confidence score with a confidence threshold. An individual confidence threshold is specified for each directional audio signal. The confidence thresholds are adjusted during operation of the system based on performance information that is generated during operation of the system. As an example, performance information may include the number of times that the trigger expression has been detected in each of the directional audio signals.

21 Claims, 3 Drawing Sheets

DYNAMIC ADJUSTMENT OF EXPRESSION DETECTION CRITERIA

BACKGROUND

Homes, offices, automobiles, and public spaces are becoming more wired and connected with the proliferation of computing devices such as notebook computers, tablets, entertainment systems, and portable communication devices. As computing devices evolve, the way in which users interact with these devices continues to evolve. For example, people can interact with computing devices through mechanical devices (e.g., keyboards, mice, etc.), electrical devices (e.g., touch screens, touch pads, etc.), and optical devices (e.g., motion detectors, camera, etc.). Another way to interact with computing devices is through audio devices that capture and respond to human speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure pertains generally to a speech interface device or other audio device that facilitates speech-based interactions with a user. The audio device has a microphone array and a loudspeaker. The microphone array captures user speech and the loudspeaker plays responsive speech.

Spoken user commands directed to the audio device are prefaced by a wake word, which is more generally referred to herein as a trigger expression. In response to detecting the trigger expression, the audio device or an associated service interprets any immediately following words or phrases as actionable speech commands.

The audio device has an audio beamformer that produces directional audio signals emphasizing sound from different directions. An expression detector analyzes the directional audio signals to detect utterances of the trigger expression. The expression detector produces a confidence score indicating the likelihood that the trigger expression is represented in an audio signal. For example, the confidence score may range from 0% to 100%, corresponding respectively to very low and very high probabilities that the trigger expression is represented in the audio signal. If the confidence score exceeds the threshold, the trigger expression is considered to have been detected as being represented in the audio signal. If the confidence score does not exceed the threshold, the trigger expression is considered not to have been detected.

The expression detector uses a different confidence threshold for each directional audio signal, based upon performance information generated during operation of the audio device. The performance information may include metrics for each directional audio signal indicating such things as the number of times the trigger expression has been detected in the directional audio signal, the number of times the trigger expression has been erroneously detected in the directional audio signal, the number of times the trigger expression has or has not been followed by recognizable speech, the number of times that the trigger expression has or has not been followed by speech corresponding to a meaning that is understood by the system, and so forth. The confidence threshold for a directional audio signal may also be based on environmental information such as the locations of persons within the environment, numbers of persons in the environment, physical activity levels within the environment, ambient audio levels within the environment, locations within the environment of potentially interfering sound sources, the presence of reflective surfaces such as walls, and so forth.

The confidence thresholds corresponding to the different directional audio signals are adjusted during operation of the audio device based on the performance information and the environmental information. Generally, the confidence thresholds are adjusted so that the thresholds associated with directional audio signals in which representations of the trigger expression are more likely to be detected are lower and less stringent than the confidence thresholds associated with directional audio signals in which representations of the trigger expression are less likely to be detected. In certain embodiments, the confidence thresholds are adjusted so that the thresholds associated with directional audio signals in which a representation of the trigger expression has been more frequently detected are lower and less stringent than the confidence thresholds associated with directional audio signals in which a representation of the trigger expression has been less frequently detected. Confidence thresholds may also be adjusted relative to each other to account for the positions of persons and/or for the positions of non-human sound sources that may produce false detections. Confidence thresholds may in some cases be adjusted together to account for general conditions such as generally high ambient noise or activity levels.

Figure 1:
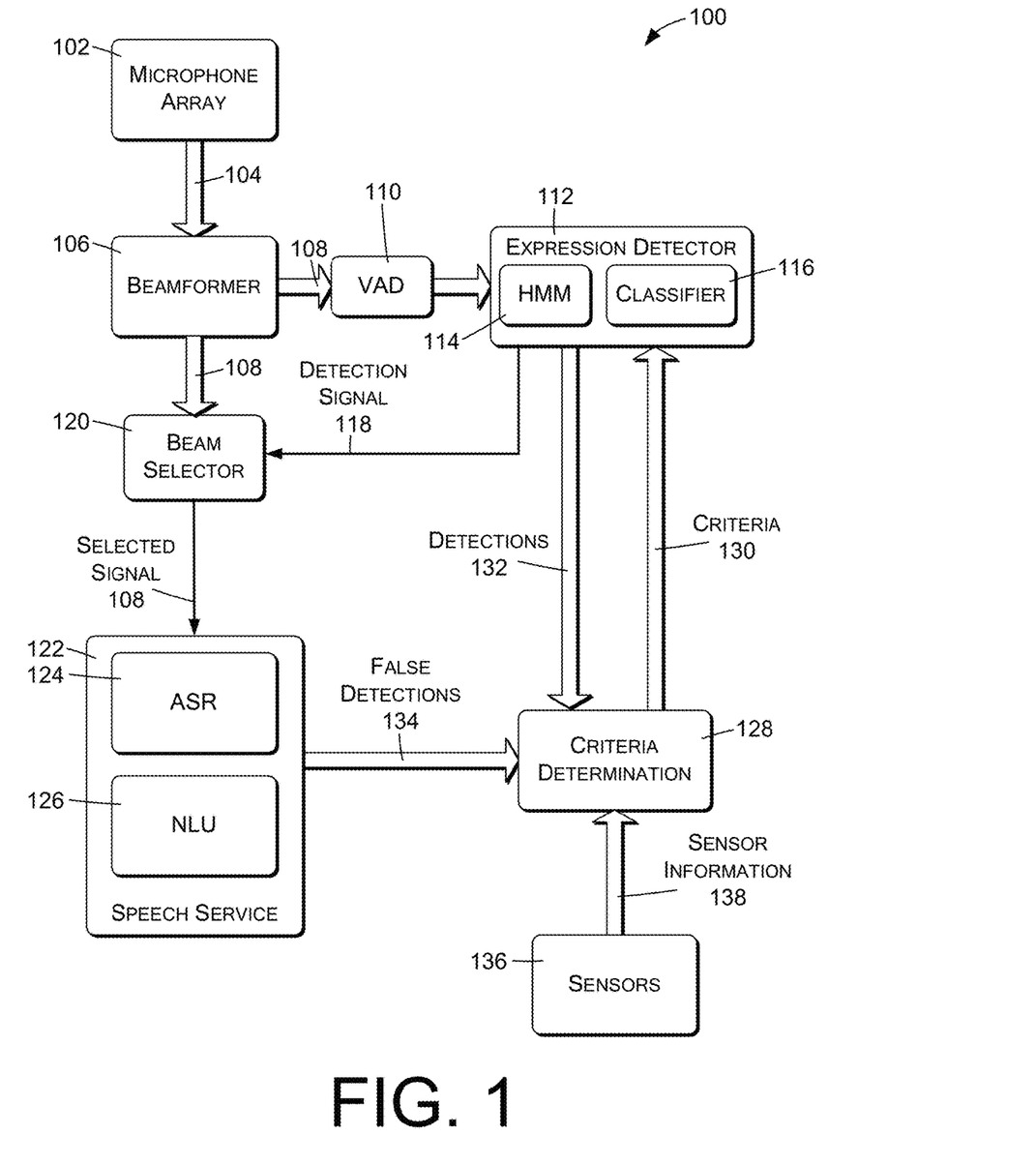
FIG. 1 is a block diagram of a system that performs speech recognition and language understanding based on user commands that are prefaced by a trigger expression.

FIG. 1 shows a system 100 that receives and responds to voice commands. The system 100 has a microphone array 102 that captures sound from the environment of the system 100. The sound may contain user speech. The speech may contain a trigger expression that has been uttered by a user as an indication that subsequent speech is directed to the system 100. The trigger expression may comprise a word, a phrase, or a sound. In some cases, the trigger expression may comprise a wake word that is detected to move the system from a low power consumption and low functionality state to a normal operating state.

The microphone array 102 has multiple microphone elements that are spaced from each other so that they can be used for audio beamforming. The microphone array 102 produces multiple microphone audio signals 104 corresponding respectively to the microphone elements of the microphone array 102.

The system 100 includes an audio beamformer or beamforming component 106. The audio beamformer 106 receives the microphone audio signals 104 and processes them to produce a plurality of directional or directionally-focused audio signals 108. Each of the directional audio signals 108 emphasizes sound from a corresponding different direction. In the described embodiment, the directional audio signals 108 correspond respectively to and emphasize sound from different radial directions relative to the microphone array 102. In other embodiments, the audio signals may correspond to and may emphasize sound from different areas of the environment.

Audio beamforming, also referred to as audio array processing, uses multiple omnidirectional microphone elements that are spaced from each other at known distances. Sound originating from a sound source is received by each of the microphone elements. However, because each microphone element is at a different distance from the sound source, a propagating sound wave arrives at the microphone elements at slightly different times. The difference in arrival time results in phase differences between audio signals produced by the microphone elements. The phase differences can be exploited to enhance or amplify sounds originating from chosen directions relative to the microphone array.

More specifically, beamforming uses signal processing techniques to combine signals from the different microphone elements so that sounds originating from a particular direction are emphasized or amplified while sounds originating from other directions are deemphasized or attenuated. In particular, signals from the different microphones are combined in such a way that sounds from a particular direction experience constructive interference, while sounds from other directions experience destructive interference. The parameters used in beamforming may be varied to dynamically select different directions, even when using a fixed-configuration microphone array.

In certain implementations, a potentially different delay is added to each microphone signal so that sounds from a particular direction become aligned in time. These delayed signals are then summed. A beamformer such as this is referred to as having a delay-sum architecture. The amount of delay for each microphone signal is determined based on the known spatial relationships of the microphones and the direction from which sounds are to be emphasized. The delays can be changed over time to receive sounds from different directions.

The system 100 has a speech activity detector 110 that detects the representation of human speech in each of the directional audio signals 108. The representation of speech is detected by analyzing a portion of an audio signal to evaluate features of the audio signal such as signal energy and frequency distribution. The features are quantified and compared to reference features to determine the likelihood that the portion of the audio signal contains a representation of speech. The likelihood may be output as probability or score, which is then compared to an activity threshold to determine whether an audio signal currently represents speech.

The speech activity detector has an adjustable sensitivity. At high sensitivities, the detector may be more prone to producing false detections. At low sensitivities, the detector may at times fail to detect certain types of speech. The sensitivity of the speech activity detector may be changed by lowering or raising the activity threshold. The activity threshold can be raised to decrease the sensitivity of the speech activity detector 110. The activity threshold can be lowered to increase the sensitivity of the speech activity detector 110. Each of the directional audio signals 108 is associated with a corresponding activity threshold, and the activity thresholds corresponding to different directional audio signals can be adjusted dynamically during operation of the system 100 to adjust the relative sensitivity of speech activity detection that. is applied to each of the audio signals.

The system 100 has an expression detector 112 that receives and analyzes the directional audio signals 108 to detect a predefined word, phrase, or other sound. In the described embodiment, the expression detector 112 is configured to detect a representation of a wake word or other trigger expression in the directional audio signals 108. The expression detector 112 analyzes an individual directional audio signal 108 in response to an indication from the speech activity detector 110 that the directional audio signal 108 contains a representation of speech.

The expression detector 112 may be implemented using keyword spotting technology. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In some cases, a keyword spotter may use simplified ASR techniques. In the example of FIG. 1, the expression detector 112 uses a Hidden Markov Model (HMM) recognizer 114 that performs acoustic modeling of the directional audio signals 108 and compares HMM models of the directional audio signals 108 to one or more reference HMM models that have been created by training for a specific trigger expression. An HMM model represents a word as a series of states. Generally, a portion of an audio signal is analyzed by comparing its HMM model to an HMM model of the trigger expression, yielding a feature score that represents the similarity of the audio signal model to the trigger expression model. In practice, the HMM recognizer 114 may produce multiple feature scores, corresponding to different features of the HMM models.

The one or more feature scores produced by the HMM recognizer 114 are received by a support vector machine (SVM) classifier 116, which produces a confidence score indicating the likelihood that an audio signal contains the trigger expression. The confidence score is compared to a confidence threshold to make a final decision regarding whether a particular portion of an audio signal represents an utterance of the trigger expression. Each of the directional audio signals 108 is associated with a corresponding confidence threshold, and the confidence thresholds corresponding to different directional audio signals can be adjusted dynamically during operation of the system 100.

In some implementations, the speech activity detector 110 may determine which of the multiple directional audio signals 108 has the highest speech presence at any given time, and the expression detector 112 may analyze only that directional audio signal 108. Thus, at any given time, expression detection is performed on the single one of the directional audio signals 108 that has the highest level of speech presence as evaluated by the speech activity detector 110.

Upon detecting a representation of the trigger expression in one of the directional audio signals 108, the expression detector 112 generates a detection signal 118. The detection signal indicates that the trigger expression has been detected and identifies the directional audio signal 108 in which the trigger expression has been detected. Note that an output from the expression detector 112 indicating that the trigger expression has been detected does not indicate a certainty that the trigger expression has been detected. Rather, it indicates that the likelihood or probability that the audio signal contains a representation of the trigger expression exceeds some threshold probability.

The detection signal 118 indicates that the trigger expression has been detected and identifies the directional audio signal 108 in which the trigger expression has been detected.

The speech service 122 may include an automatic speech recognition (ASR) component 124 that recognizes speech represented in the directional audio signal 108. In contrast to the expression detector 112, which may sometimes be capable only of a binary decision regarding whether or not any given portion of an audio signal represents a predefined word or other expression, the ASR component 124 uses backward and forward context to create a full transcript of speech words represented in the selected audio signal 108, not limited to the detection of a particular word or other expression.

The ASR component 124 may reference various types of models, such as acoustic models and language models, to recognize words of speech that is represented in an audio signal. In many cases, models such as these are created by training, such as by sampling many different types of speech and manually classifying.

An acoustic model may represents speech as a series of vectors corresponding to features of an audio waveform over time. The features may correspond to frequency, pitch, amplitude, and time patterns. Statistical models such as Hidden Markov Models (HMMs) and Gaussian mixture models may be created based on large sets of training data. Models of received speech are then compared to models of the training data to find matches.

Language models describe things such as grammatical rules, common word usages and patterns, dictionary meanings, and so forth, to establish probabilities of word sequences and combinations. Analysis of speech using language models may be dependent on context, such as the words that come before or after any part of the speech that is currently being analyzed.

ASR may provide recognition candidates, which may comprise words, phrases, sentences, or other segments of speech. The candidates may be accompanied by statistical probabilities, each of which indicates a "confidence" in the accuracy of the corresponding candidate. Typically, the candidate with the highest confidence score is selected as the output of the speech recognition.

The speech service 120 may also include a natural language understanding (NLU) component 126 that determines a meaning of the speech. The NLU component 126 analyzes a word stream provided by the ASR component 124 and produces a representation of a meaning of the word stream. For example, the NLU component 126 may use a parser and grammar rules to analyze a sentence and to produce a representation of a meaning of the sentence in a formally defined language that conveys concepts in a way that is easily processed by a computer. For example, the meaning may be semantically represented as a hierarchical set or frame of slots and slot values, where each slot corresponds to a semantically defined concept. Thus, the meaning of the sentence may be semantically represented by the frame of slots and slot values. NLU may also use statistical models and patterns generated from training data to leverage statistical dependencies between words in typical speech.

The system has criteria determination logic 128, also referred to herein as control logic 128, that specifies detection criteria 130 to the expression detector 112. One or more criteria 130 are provided for each of the directional audio signals 108. In the described embodiment, the criteria 130 comprise confidence thresholds that are used by the expression detector 112 to detect the trigger expression in the directional audio signals 108. For purposes of discussion, it will be assumed that the criteria 130 comprise a single probability threshold for each of the multiple directional audio signals 108. In certain embodiments, however, the criteria 130 may include multiple thresholds or other parameters corresponding to any single one of the directional audio signals 108.

Generally, the criteria determination logic 128 is configured to specify less stringent criteria for those directional audio signals 108 that are more likely to represent the trigger expression, and to specify more stringent criteria for those directional audio signals 108 that are less likely to represent the trigger expression. Whether a particular directional audio signal 108 is likely to represent the trigger expression may be evaluated based on the number of times that the trigger expression has previously been detected in the directional audio signal 108 and/or on the number of times that the trigger expression has been erroneously detected in the directional audio signal 108. If the trigger expression has been detected in a first directional audio signal more frequently than in a second directional audio signal, the criteria corresponding to the first and second directional audio signals are adjusted so that the first directional audio signal has less stringent criteria than the second directional audio signal. Less stringent criteria correspond to lower probability thresholds. More stringent criteria correspond to higher probability thresholds. If the trigger expression has been erroneously detected in the first directional audio signal more frequently than in the second directional audio signal, the criteria corresponding to the first and second directional audio signals are adjusted so that the first directional audio signal has more stringent criteria than the second directional audio signal.

In order to determine relative threshold values, the criteria determination logic 128 may receive performance information from the expression detector 112 and from the speech service 122. For example, the criteria determination logic 128 may receive detection information 132 from the expression detector 112, indicating each time that the trigger expression is detected in each of the directional audio signals 108. The criteria determination logic 128 may also receive false detection information 134 from the speech service 122, indicating each time the trigger expression is erroneously detected in a particular directional audio signal 108.

The criteria determination component 128 is configured to accumulate performance information over time. The accumulated performance information may include, for each directional audio signal:

a detection count indicating the number of times the trigger expression has been detected as being represented in the directional audio signal; and (b) a false detection count indicating the number of times that the trigger expression has been erroneously detected as being represented in the directional audio signal.

During operation of the system 100 the criteria determination logic 128 repeatedly and dynamically adjusts the criteria 130 based on the accumulated performance information. Generally, confidence thresholds corresponding to directional audio signals having high detection counts and low false detection counts are lower than confidence thresholds corresponding to directional audio signals having low detection counts and high false detection counts.

The relationship between a pair of first and second thresholds, corresponding to first and second directional audio signals, is reflected by a ratio of the first threshold to the second threshold. In certain embodiments, at least one of the first and second thresholds is adjusted so that the inverse of the threshold ratio is equal to a detection ratio, where the detection ratio is the ratio of (a) a first number of times that the trigger expression is detected as being spoken from the direction corresponding to the first directional audio signal to (b) a second number of times that the trigger expression is detected as being spoken from the direction corresponding to the second directional audio signal. More generally, the criteria determination logic 128 adjusts one or more of the first and second thresholds to (a) decrease the threshold ratio in response to an increase in the detection ratio and (b) increase the threshold ratio in response to a decrease in the detection ratio.

The system 100 may also include various types of sensors 136 such as proximity sensors, cameras, depth imaging devices, etc., which may provide sensor information 138 to the criteria determination logic 128. The sensor information 138 may be analyzed to determine the locations of users within the environment of the system 100, the locations of non-human sound sources that may interfere with the ability of the expression detector 112 to detect valid trigger expression utterances, and other information regarding the environment.

As a specific example, the sensors 136 may include a machine vision component or system that visually inspects the environment of the system 100 to determine directions or locations of persons and objects within the environment. For example, the machine vision component may include an optical camera and/or a depth camera that produces one or more images of the environment, which are then analyzed to detect and identify persons and objects within the environment. The images may be further analyzed to determine the locations or directions of the persons and objects. In some cases, the machine vision component may identify the locations or directions of non-human sound sources such as may be likely to produce false detections of the trigger expression.

The criteria determination logic 128 may be configured to analyze the sensor information 138 to determine environmental information that may be used to adjust the criteria 130. Such additional information may include the location of a person who is within the environment, the number of persons who are present within the environment, the level of physical activity within the environment, the level of voice activity within the environment, the level of sound energy within the environment, the level of illumination within the environment, and so forth. These measurements and levels may be evaluated over time to determine average levels and used to adjust the criteria 130. For example, the criteria 130 corresponding to the direction in which a person is located may be relaxed in the expectation that sound coming from that direction is more likely to contain the trigger expression. Similarly, the criteria 130 corresponding to the direction of a non-human sound source, such as a radio or television, may be elevated in the expectation that sound coming from that direction is relatively less likely to contain a valid utterance of the trigger expression.

As another example, the criteria corresponding to all of the directional audio signals 108 may be lowered upon detecting the presence of multiple users within the environment of the system 100 and/or upon detecting high levels of audio or physical activity within the environment. Generally, various combinations of the evaluated environmental conditions may be used to indicate or hint that speech commands are more or less likely to be received in general and/or from specific directions, and the general levels of the detection criteria 130 may be adjusted accordingly.

Figure 2:
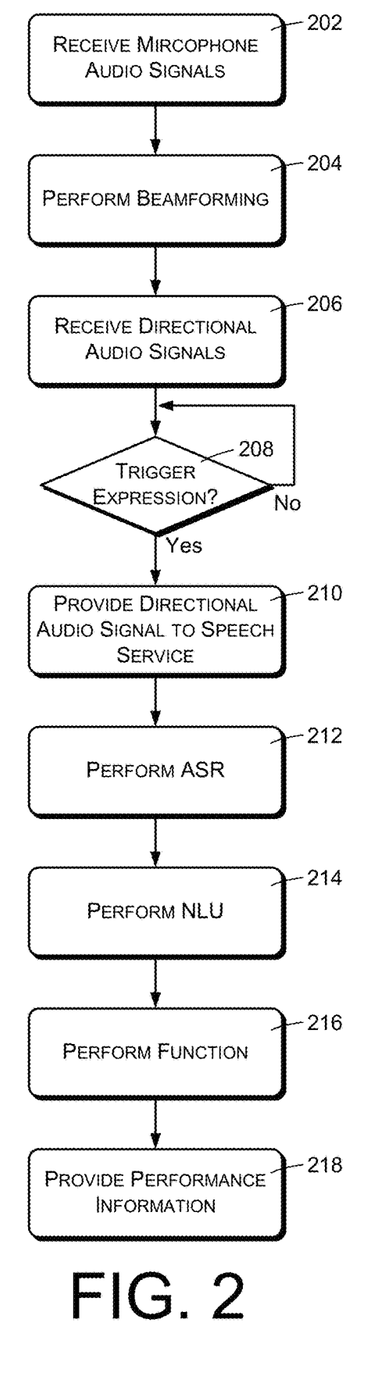
FIG. 2 is a flow diagram illustrating an example method of detecting a trigger expression based on dynamically specified criteria and of responding to speech that follows the trigger expression.

FIG. 2 illustrates an example method 200 of processing audio input to determine and act upon a spoken command that indicates a user intent. The actions of the example method 200 may be performed by the system 100 or by other devices or systems.

An action 202 comprises receiving multiple microphone audio signals produced by a microphone array. The microphone array has multiple microphone elements that are spaced in a known configuration for use by beamforming components of the system. The microphone audio signals may contain human speech, which may in turn include a predefined trigger expression. The trigger expression may comprise a word, phrase, or other sound that is used as a signal that subsequent speech is directed by a user to the system. The trigger expression may be used as a wake word to "wake" a device from a low-power state.

An action 204 comprises performing audio beamforming by processing the microphone audio signals to produce multiple directional audio signals, where each directional audio signal emphasizes sound from a different direction. An action 206 comprises receiving the directional audio signals.

In some implementations, directional audio signals may be produced by and received from directional microphones rather than an audio beamformer. In some cases, audio signals may be produced by and received from microphones distributed throughout an environment to emphasize sound that originates from different areas of the environment.

An action 208 comprises analyzing the directional audio signals to detect a representation of the trigger expression in the audio signals, based on one or more detection criteria corresponding to each of the directional microphone signals. In one implementation, the detection criteria comprise confidence thresholds corresponding respectively to each of the directional audio signals.

In certain embodiments, the action 208 may be performed with respect to a particular directional audio signal by an expression detector that analyzes the directional audio signal to produce a confidence score. The confidence score indicates the likelihood that the trigger expression is represented in the directional audio signal. The action 208 comprises comparing the confidence score of the directional audio signal with a confidence threshold corresponding to that directional audio signal. If the confidence score does not exceed the threshold, the system does not declare that the trigger expression has been detected in the directional audio signal and the action 208 is repeated to continue attempting to detect the trigger expression.

If the confidence score exceeds the confidence threshold, the system declares that the trigger expression has been detected as having been spoken from the direction corresponding to the directional audio signal and an action 210 is performed of providing the directional audio signal to a speech service for speech processing, to determine the meaning speech that occurs immediately after the trigger expression. The speech service may comprise a logical component of an audio device or may comprise a network-based service with which the audio device communicates.

The speech service may include an action 212 of performing automatic speech recognition (ASR) on the directional audio signal to recognize speech represented in the audio signal. In some cases, the action 212 may include analyzing the directional audio signal to more definitively determine whether the trigger expression was present. This analysis may at times reveal that the action 208 has produced a false or erroneous detection, and that the trigger expression was not actually present in the directional audio signal. Furthermore, the analysis may at times fail to recognize any speech that follows the trigger expression, from which it may be inferred that the detection of the trigger expression is likely to have been an error.

The speech processing may also include an action 214 of performing natural language understanding (NLU) on the speech recognized in the action 212 in order to determine the meaning of the speech. Note that this analysis may at times fail to determine any meaning that is understood by the system, from which it may be inferred that the detection of the trigger expression by the expression detector is likely to have been an error.

An action 216 comprises performing a function or service in response to or in fulfillment of the determined user intent, assuming that the ASR and NLU were able to recognize speech and to determine an actionable user intent. For example, the action 216 may comprise playing music in response to the spoken command "play music." The system may of course be capable of responding to more complex commands, and of conducting a two-way dialog with a user to determine and clarify a user intent.

An action 218 comprises providing performance information to the criteria determination logic. The performance information may indicate the number of times that the trigger expression has been detected in each of the directional audio signals. In some implementations, the performance information may also indicate the number of times that ASR and/or NLU failed for each directional audio signal. The performance information may indicate the number of times that the expression detector erroneously detected the trigger expression in each directional audio signal. In some cases, the ASR may explicitly indicate that a detection was erroneous. In other cases, an erroneous detection may be inferred from the failure of the ASR to recognize subsequent speech and/or the failure of the NLU to determine a supported or actionable meaning of the speech.

In some cases, the performance information may indicate a number of "near-misses", corresponding to the number of times that the expression detector produced a score near but still less than the confidence threshold.

Figure 3:
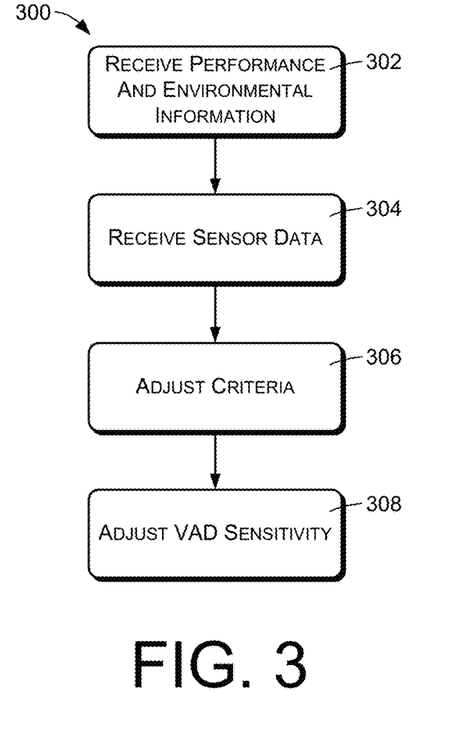
FIG. 3 is a flow diagram illustrating an example method of dynamically adjusting the detection criteria used in the method of FIG. 2.

FIG. 3 illustrates a method 300 of calculating and/or adjusting the detection criteria used in the method 200. An action 302 comprises receiving performance information. As already described, the performance information may indicate, for each direction and/or for each directional audio signal, the number of trigger expression detections that have occurred, the number of mistaken trigger expression detections that have occurred, the number of trigger detections that were or were not followed by recognizable speech, the number of trigger detections that did or did not result in the determination of an actionable meaning, and so forth. The performance information may also indicate a number of near-misses, where the expression detector produced a confidence level that was just under a corresponding confidence threshold.

An action 304 comprises receiving sensor data or other information regarding the environment of the device. For example, sensor data may comprise optical images of the environment and/or depth images of the environment, which may be analyzed to detect positions of persons and objects within the environment. In some cases, sensor data may indicate or allow determination of the locations of people within an environment, the number of people within the environment, the level of physical activity of the people in the environment, the level of audio or speech activity within the environment, the level of ambient sound in the environment, the level of illumination within the environment, etc. The sensor data may also indicate or allow identification of objects within the environment, including objects such as televisions or radios that are likely to produce erroneous detections of the trigger expression.

An action 306 comprises adjusting the criteria used in the action 208 based on the received performance information and the received sensor data. Adjusting the criteria may comprise adjusting the confidence thresholds that are used when detecting the trigger expression in the different directional audio signals. Adjusting the criteria may also comprise adjusting the detection sensitivity of speech activity detection.

With regard to a pair of first and second confidence thresholds, one or more of the first and second confidence thresholds may be adjusted to increase or decrease a threshold ratio, wherein the threshold ratio comprises the ratio of the first confidence threshold to the second confidence threshold. In one embodiment, at least one of the first and second thresholds is adjusted to (a) decrease the threshold ratio in response to an increase in a detection ratio and (b) increase the threshold ratio in response to a decrease in the detection ratio. The detection ratio comprises a ratio of (a) a first number of times that the trigger expression has been detected in the first directional audio signal to (b) a second number of times that the trigger expression has been detected the second directional audio signal. In order to increase the threshold ratio, the first threshold may be increased or the second threshold may be decreased. In order to decrease the threshold ratio, the first threshold may be decreased or the second threshold may be increased.

In certain embodiments, at least one of the first and second thresholds is adjusted as a function of the number of times the trigger expression has been erroneously detected as being represented in the first and second directional audio signals. More specifically, the threshold ratio is increased in response to determining that the trigger expression has been erroneously detected as being represented in the first directional audio signal and decreased in response to determining that the trigger expression has been erroneously detected as being represented in the second directional audio signal.

In some embodiments, the confidence threshold may be reduced for an audio signal corresponding to a direction that consistently produces near-misses, under the assumption that repeated utterances that come close to meeting the confidence threshold are likely to represent valid trigger expression utterances.

In certain embodiments, at least one of the first and second thresholds is adjusted to decrease the threshold ratio when sensor data indicates the presence of a person who is positioned in the direction of the directional audio signal.

In certain embodiments, at least one of the first and second thresholds is adjusted to increase the threshold ratio in response to detecting the presence of a non-human source of sound that is in the first direction.

Other adjustments may include adjusting at least one of the first and second thresholds to increase the threshold ratio in response to being unable to recognize speech following the detected trigger expression and/or being unable to determine an actionable user intent expressed by speech following the detected trigger expression.

The action 306 may also include adjusting general levels of the thresholds in certain conditions. For example, the system may analyze environmental information to detect certain situations in which one of multiple users within the environment are more likely to utter the trigger expression and to adjust all of the thresholds together to relax the detection criteria. For example, high sound energy levels within the environment for a prolonged time such as a minute or more may indicate a need to make the detection criteria more stringent.

In some embodiments, an action 308 may be performed. The action 308 comprises adjusting the detection sensitivities of the speech activity detector based on the performance information and/or the sensor data. Generally, the sensitivity of the speech activity detector may be increased for directional audio signals that are more likely to represent the trigger expression. The sensitivity of the speech activity detector may be decreased for directional audio signals that are less likely to represent the trigger expression. The sensitivity of the speech activity detector may be controlled or adjusted by changing an activity threshold, which may be specified and adjusted individually for each directional audio signal.

The activity threshold for a particular directional audio signal may be raised or lowered based on the same factors that are used when adjusting the confidence thresholds. For example, the sensitivity or threshold corresponding to a particular directional audio signal may be adjusted based at least in part on the number of times that the trigger expression has been detected as being spoken from the direction corresponding to the directional audio signal, the number of times that the trigger expression has been erroneously detected as being spoken from the direction corresponding to the directional audio signal, the locations or directions of one or more persons within the environment, and so on.

Figure 4:
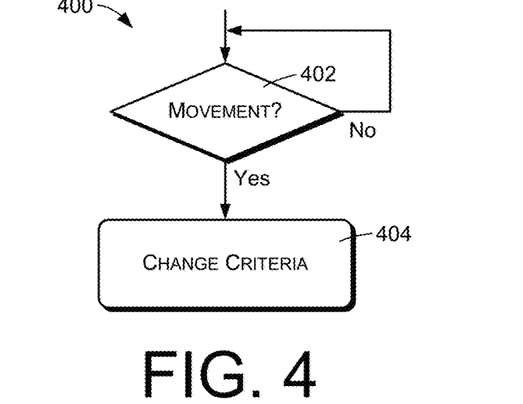
FIG. 4 is a flow diagram illustrating an example method of resetting the detection criteria in response to movement of voice-controlled audio device.

FIG. 4 illustrates an example method 400 that may be used in some embodiments to reset the detection criteria. An action 402 comprises detecting rotational or translational movement of an audio device that performs speech processing and trigger expression detection as described above. Such movement of the audio device may be detected by means of a sensor, such as an accelerometer, that is incorporated in the audio device. Alternatively, the action 402 may comprise tracking audio characteristics of the individual directional audio signals and noting significant changes in the audio signal characteristics. Such characteristics may include levels or frequencies of ambient noise, echo characteristics, etc. When these characteristics changes, it may be assumed that the audio device has been moved. The action 402 is repeated as long as not movement is detected.

If movement of the audio device is detected, an action 404 is performed of resetting the detection criteria to default values. For example, the confidence thresholds corresponding to all of the directional audio signals may be set to the same default value. Alternatively, the action 404 may comprise shifting the confidence thresholds among the directional audio signals in accordance with rotational movement of the audio device.

Figure 5:
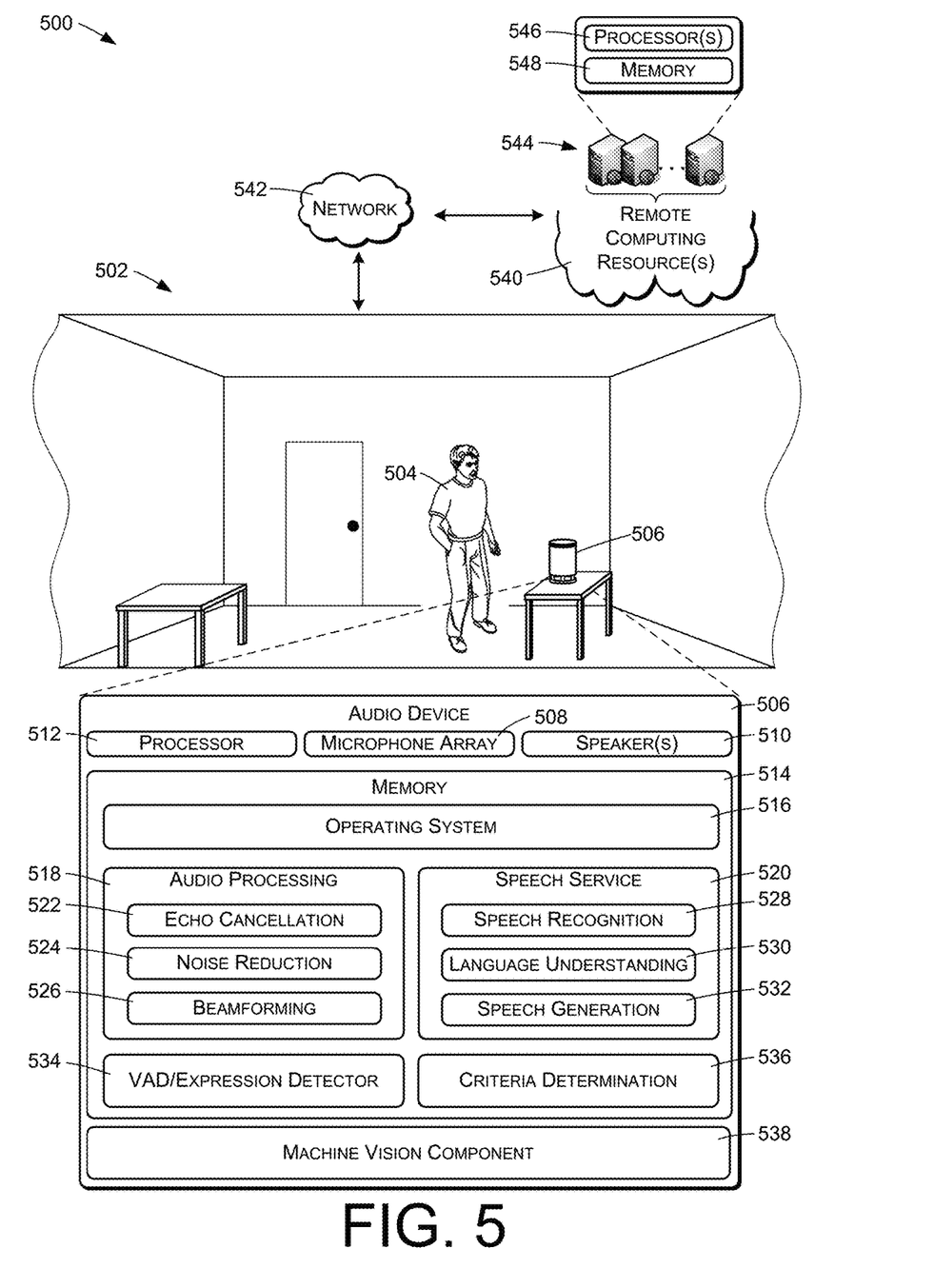
FIG. 5 is a diagram of an illustrative voice interaction computing architecture that includes the voice-controlled audio device.

FIG. 5 shows an illustrative voice interaction computing architecture 500 set in an environment 502, such as a home environment, that includes a user 504. The architecture 500 includes an electronic, voice-controlled audio device 506 with which the user 504 may interact and which may implement the techniques described above.

The audio device 506 has a microphone array 508 and one or more audio loudspeakers 510 to facilitate audio interactions with the user 504 and/or other users. The microphone array 508 produces microphone audio signals representing audio from the environment 502 such as sounds uttered by the user 504. The microphone audio signals produced by the microphone array 508 may comprise directional audio signals or may be used to produce directional audio signals, where each of the directional audio signals emphasizes audio from a different direction relative to the microphone array 508.

The audio device 506 includes control logic, which may comprise a processor 512 and memory 514. The processor 512 may include multiple processors and/or a processor having multiple cores. The memory 514 may contain applications and programs in the form of instructions that are executed by the processor 512 to perform acts or actions that implement desired functionality of the audio device 506, including the functionality specifically described herein. The memory 514 may be a type of computer storage media and may include volatile and nonvolatile memory. Thus, the memory 514 may include, but is not limited to, RAM, ROM, EEPROM, flash memory, or other memory technology.

The audio device 506 may have an operating system 516 that is configured to manage hardware and services within and coupled to the audio device 506. In addition, the audio device 506 may include audio processing components 518 and speech processing components 520.

The audio processing components 518 may include functionality for processing microphone audio signals generated by the microphone array 508 and/or output audio signals provided to the loudspeaker 510. As an example, the audio processing components 518 may include an acoustic echo cancellation or suppression component 522 for reducing acoustic echo generated by acoustic coupling between the microphone array 508 and the loudspeaker 510. The audio processing components 518 may also include a noise reduction component 524 for reducing noise in received audio signals, such as elements of microphone audio signals other than user speech.

The audio processing components 518 may include one or more audio beamformers or beamforming components 526 that are configured to generate directional audio signals that are focused in different directions. More specifically, the beamforming components 526 may be responsive to spatially separated microphone elements of the microphone array 508 to produce audio signals that emphasize sounds originating from different areas of the environment 502 or from different directions relative to the audio device 506.

The speech processing components 520 receive a directional audio signal that has been processed by the audio processing components 518 and perform various types of processing in order to understand the intent expressed by human speech. The speech processing components 520 may include an automatic speech recognition (ASR) component 528 that recognizes human speech in the received audio signal. The speech processing components 520 may also include a natural language understanding (NLU) component 530 that is configured to determine user intent based on recognized speech of the user 504.

The speech processing components 520 may also include a text-to-speech or speech generation component 532 that converts text to audio for generation at the loudspeaker 510.

The audio device 506 may include a detector 534 that functions as an expression detector and/or as a speech activity detector based on variable detection criteria. The audio device may also include a criteria determination component 536 that generates and/or adjusts the detection criteria during operation of the audio device 506 as described herein.

The audio device 305 may include a machine vision component 538 that visually analyzes the environment 502 to determine the directions or positions of various types of sound sources. For example, the machine vision component 538 may determine the directions or positions of one or more people within the environment 502, the number of people within the environment 502, and the locations or directions of objects that may produce sound.

The machine vision component may comprise one or more cameras, such as still-image cameras, video cameras, infrared cameras, depth cameras or sensors, etc. that produce images of the environment. The machine vision component 538 may further include analytical logic for analyzing the images to detect the locations or directions of objects. For example, the machine vision component may use machine vision techniques, including object recognition face detection and so forth to identify people and objects and their positions within an environment. More specifically, a camera may produce an image that may be processed in various ways such as by using edge detection, surface segmentation, and boundary detection to identify areas of the image that may correspond to people or objects. The machine vision system may then perform processes such as pattern recognition, shape recognition, and so forth to identify people and objects. The positions of the people and objects may be derived from the positions within the images at which they are shown.

In certain embodiments, the primary mode of user interaction with the audio device 506 may be through speech. For example, the audio device 506 may receive spoken commands from the user 504 and provide services in response to the commands. The user 504 may speak a predefined trigger expression (e.g., "Awake"), which may be followed by instructions or directives (e.g., "I'd like to go to a movie. Please tell me what's playing at the local cinema."). Provided services may include performing actions or activities, rendering media, obtaining and/or providing information, providing information via generated or synthesized speech via the audio device 506, initiating Internet-based services on behalf of the user 504, and so forth.

In some instances, the audio device 506 may operate in conjunction with or may otherwise utilize computing resources 540 that are remote from the environment 502. For instance, the audio device 506 may couple to the remote computing resources 540 over a network 542. As illustrated, the remote computing resources 540 may be implemented as one or more servers or server devices 544. The remote computing resources 540 may in some instances be part of a network-accessible computing platform that is maintained and accessible via a network 542 such as the Internet. Common expressions associated with these remote computing resources 540 may include "on-demand computing", "software as a service (SaaS)", "platform computing", "network-accessible platform", "cloud services", "data centers", and so forth.

Each of the servers 544 may include processor(s) 546 and memory 548. The servers 544 may perform various functions in support of the audio device 506, and may also provide additional services in conjunction with the audio device 506. Furthermore, one or more of the functions described herein as being performed by the audio device 506 may be performed instead by the servers 544, either in whole or in part. As an example, the servers 544 may in some cases provide the functionality attributed above to the speech processing components 520.

The audio device 506 may communicatively couple to the network 542 via wired technologies (e.g., wires, universal serial bus (USB), fiber optic cable, etc.), wireless technologies (e.g., radio frequencies (RF), cellular, mobile telephone networks, satellite, Bluetooth, etc.), or other connection technologies. The network 542 is representative of any type of communication network, including data and/or voice network, and may be implemented using wired infrastructure (e.g., coaxial cable, fiber optic cable, etc.), a wireless infrastructure (e.g., RF, cellular, microwave, satellite, Bluetooth®, etc.), and/or other connection technologies.

Although the audio device 506 is described herein as a voice-controlled or speech-based interface device, the techniques described herein may be implemented in conjunction with various different types of devices, such as telecommunications devices and components, hands-free devices, entertainment devices, media playback devices, and so forth.

Although the subject matter has been described in language specific to certain features, it is to be understood that the subject matter defined in the appended claims is not necessarily limited to the specific features described. Rather, the specific features are disclosed as illustrative forms of implementing the claims.

The invention claimed is:

1. A system comprising:
a microphone array including a first microphone and a second microphone, the first microphone configured to generate a first audio signal and the second microphone configured to generate a second audio signal;
an audio beamformer configured to process the first audio signal and the second audio signal to produce a first directional audio signal and a second directional audio signal, wherein the first directional audio signal emphasizes sound from a first direction and the second directional audio signal emphasizes sound from a second direction;
non-transitory computer-readable medium having computer-executable instructions stored thereupon which, when executed by a computer, perform operations comprising:
analyzing the first directional audio signal to produce a first score indicating a likelihood that a trigger expression is represented in the first directional audio signal;
comparing the first score to a first threshold to detect that first audio from the first direction includes the trigger expression;
analyzing the second directional audio signal to produce a second score indicating a likelihood that the trigger expression is represented in the second directional audio signal; and
comparing the second score to a second threshold to detect that second audio from the second direction includes the trigger expression; and
control logic configured to perform operations comprising:
decreasing the first threshold or increasing the second threshold based at least in part on an increase in a detection ratio, the detection ratio comprising a ratio between a first number of times that the trigger expression is detected from the first direction and a second number of times that the trigger expression is detected from the second direction, or
increasing the first threshold or decreasing the second threshold based at least in part on a decrease in the detection ratio; and
causing, based at least in part on at least one of the first directional audio signal or the second directional audio signal including the trigger expression, the system to transition from a first mode to a second mode, wherein the first mode has a lower power consumption than the second mode.

2. The system of claim 1, further comprising:
a speech activity detector configured to detect a representation of human speech in the first directional audio signal, the speech activity detector having a sensitivity that is adjusted by changing an activity threshold;
wherein the computer-executable instructions, when executed by the computer, further perform an operation comprising analyzing the first directional audio signal based at least in part on detection of the representation of human speech in the first directional audio signal; and
wherein the control logic is further configured to perform operations comprising:
increasing, based at least in part on a decrease in the detection ratio, the activity threshold, or
decreasing, based at least in part on an increase in the detection ratio, the activity threshold.

3. The system of claim 1, further comprising:
a speech recognition component configured to identify speech represented by the first directional audio signal; and
wherein the control logic is further configured to perform operations comprising:
determining that the trigger expression is absent from the recognized speech, and
decreasing the first threshold or increasing the second threshold based at least in part on determining that the trigger expression is absent from the recognized speech.

4. The system of claim 1, further comprising:
a speech recognition component configured to identify speech that is represented by the first directional audio signal;
a natural language understanding component configured to determine that a meaning is not associated with the speech; and
wherein the control logic is further configured to perform operations comprising decreasing the first threshold or increasing the second threshold.

5. A device, comprising:
an audio beamformer configured to produce a first directional audio signal and a second directional audio signal, the first directional audio signal emphasizing sound from a first direction and the second directional audio signal emphasizing sound from a second direction;
non-transitory computer-readable medium having computer-executable instructions stored thereupon which, when executed by a computer, perform operations comprising:
analyzing, based at least in part on a first threshold, the first directional audio signal to determine whether first audio from the first direction includes a trigger expression; and
analyzing, based at least in part on a second threshold, the second directional audio signal to determine whether second audio from the second direction includes the trigger expression; and
control logic configured to:
adjust at least one of the first threshold or the second threshold based at least in part on a first number of times that the trigger expression is detected from the first audio and a second number of times that the trigger expression is detected from the second audio, and
cause, based at least in part on at least one of the first directional audio signal or the second direction audio signal including the trigger expression, the device to transition from a first mode to a second mode, wherein the first mode has a lower power consumption than the second mode.

6. The device of claim 5, wherein the first number of times is greater than the second number of times, and wherein the control logic is further configured to adjust at least one of the first threshold or the second threshold such that the first threshold is less than the second threshold.

7. The device of claim 5, further comprising:
a machine vision component configured to detect a presence of a person in the first direction, and wherein the control logic is further configured to decrease the first threshold or increase the second threshold.

8. The device of claim 5, further comprising:
a machine vision component configured to detect a presence of a non-human source of sound in the first direction, and wherein the control logic is further configured to decrease the first threshold or increase the second threshold.

9. The device of claim 5, wherein the control logic is further configured to:
send, based at least in part on detecting a presence of the trigger expression in the first directional audio signal, the first directional audio signal to a speech service;
receive, from the speech service, an indication that the trigger expression is not represented in the first directional audio signal; and
increase the first threshold or decrease the second threshold.

10. The device of claim 5, wherein the first directional audio signal contains a representation of speech, and wherein the control logic is further configured to:
send the first directional audio signal to a speech service to determine a meaning of the of the speech;
receive an indication from the speech service that the speech does not correspond to an understood meaning; and
increase the first threshold or decrease the second threshold.

11. The device of claim 5, further comprising:
a speech activity detector configured to detect a representation of human speech in the first directional audio signal, the speech activity detector having an adjustable sensitivity; and
wherein the control logic is further configured to adjust the sensitivity of the speech activity detector based at least in part on the first number of times that the trigger expression is detected from the first audio and the second number of times that the trigger expression is detected from the second audio.

12. The device of claim 5, wherein the control logic is further configured to reset, based at least in part on translational or rotational movement of the device, at least one of the first threshold or the second threshold to a default value.

13. The device of claim 5, wherein adjusting at least one of the first threshold or the second threshold is based at least in part on a first amplitude of the first directional audio signal or a second amplitude of the second directional audio signal being greater than a threshold amplitude for at least a predetermined amount of time.

14. A method, comprising:
receiving audio data representing sound captured by a device within an environment;

identifying, from the audio data and using natural language processing techniques, a first number of utterances of a trigger expression from a first area of the environment;

identifying, from the audio data and using natural language processing techniques, a second number of utterances of the trigger expression from a second area of the environment;

adjusting, based at least in part on the first number of utterances and the second number of utterances, criteria associated with detection of the trigger expression; and causing, based at least in part on detection of the trigger expression from at least one of the first area or the second area, the device to transition from a first mode to a second mode, wherein the first mode has a lower power consumption than the second mode.

15. The method of claim 14, wherein the first area and the second area correspond respectively to a first direction and a second direction relative to a microphone array.

16. The method of claim 14, further comprising:
analyzing, based at least in part on an activity threshold associated with an audio signal, the audio signal to detect a representation of human speech; and
adjusting, based at least in part on the first number of utterances and the second number of utterances, the activity threshold.

17. The method of claim 14, further comprising:
receiving information indicating a presence of one or more people within the environment; and
adjusting, based at least in part on the information, the criteria.

18. The method of claim 14, further comprising:
receiving image data corresponding to an image of the environment;
analyzing the image data to determine that a person is within the first area; and
adjusting a first criterion of the criteria based at least in part on the image data, the first criterion associated with detection of the trigger expression from the first area.

19. The method of claim 14, further comprising:
receiving information regarding the environment;
adjusting, based at least in part on the information, the criteria; and
wherein the information comprises at least one of:
a location of a person who is within the environment;
a number of persons who are present within the environment;
a level of physical activity within the environment;
a level of speech activity;
a level of sound energy within the environment; or
a level of illumination within the environment.

20. The method of claim 14, wherein the criteria include a confidence threshold at which the trigger expression is determined to be detected.

21. The method of claim 14, wherein the criteria include a sensitivity of one or more microphones of the device for capturing audio.

* * * * *